United States Patent
Russ (10) Patent No.: US 8,651,815 B2
(45) Date of Patent: Feb. 18, 2014

(54) LIGHTWEIGHT STOW ABORT MECHANISM

(75) Inventor: David Everett Russ, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 752 days.

(21) Appl. No.: 12/819,331

(22) Filed: Jun. 21, 2010

(65) Prior Publication Data

US 2011/0229309 A1 Sep. 22, 2011

Related U.S. Application Data

(63) Continuation-in-part of application No. 12/728,403, filed on Mar. 22, 2010.

(51) Int. Cl.
*F04D 29/18* (2006.01)

(52) U.S. Cl.
USPC .......................................... 416/143; 416/148

(58) Field of Classification Search
USPC .................... 416/142, 143, 147, 148, 246
See application file for complete search history.

(56) References Cited

U.S. PATENT DOCUMENTS

| | | | |
|---|---|---|---|
| 4,676,458 A | 6/1987 | Cohen | |
| 4,717,095 A | 1/1988 | Cohen et al. | |
| 4,742,976 A | 5/1988 | Cohen | |
| 4,743,163 A | 5/1988 | Markunas et al. | |
| 5,123,614 A * | 6/1992 | Whitehouse | 244/58 |
| 5,820,074 A | 10/1998 | Trommer et al. | |
| 6,581,874 B2 | 6/2003 | Lemire et al. | |
| 7,063,290 B2 | 6/2006 | Marche | |
| 7,416,392 B2 * | 8/2008 | Russ | 416/142 |
| 2006/0260323 A1 | 11/2006 | Moulebhar | |
| 2007/0237640 A1 | 10/2007 | Russ | |

FOREIGN PATENT DOCUMENTS

| | | |
|---|---|---|
| GB | 2479039 | 9/2011 |
| WO | 87/02642 | 5/1987 |

OTHER PUBLICATIONS

United Kingdom Combined Search and Examination Report for GB1110478.3 dated Oct. 11, 2011.
UnitedUnited Kingdom Combined Search and Examination Report for Application No. GB1103869.2 dated Jun. 27, 2011.

* cited by examiner

*Primary Examiner* — Nathaniel Wiehe
*Assistant Examiner* — Adam W Brown
(74) *Attorney, Agent, or Firm* — Carlson, Gaskey & Olds, P.C.

(57) ABSTRACT

A ram air turbine (RAT) includes a movable turbine support structure that is prevented from moving to a stowed position by a stow abort mechanism when turbine blades are not locked in a desired position. The stow abort mechanism includes a pawl that is driven by a cam on a release lever. The release lever is movable in response to a position of a release pin that prevents rotation of a turbine drive shaft from a desired orientation that locks the turbine blades in a desired position required for stowage. Disengagement of the release pin causes the stow abort mechanism to maintain a position where the pawl blocks movement to the deployed position. Engagement of the release pin to prevent rotation results in movement of the pawl to a position that provides for movement to the stowed position.

15 Claims, 8 Drawing Sheets

LIGHTWEIGHT STOW ABORT MECHANISM

CROSS REFERENCE TO RELATED APPLICATION

This application is a continuation in part of U.S. application Ser. No. 12/728,403 which was filed on Mar. 22, 2010.

BACKGROUND

This disclosure generally relates to a deployment mechanism for a ram air turbine. More particularly, this disclosure relates to a deployment mechanism that includes features that prevent storage of the ram air turbine when the turbine is not in a desired orientation.

A ram air turbine is used to generate supplemental power in an aircraft by extracting power from an air stream proximate the exterior of the aircraft during flight. The ram air turbine includes a turbine that drives an electric motor or hydraulic pump that is suspended on a strut assembly. In operation, the turbine is moved outward from the aircraft to a position that provides clearance between blades of the turbine and the aircraft. A release mechanism prevents rotation of the blades until the turbine is sufficiently clear of the aircraft. Storage of the ram air turbine after use requires that the blades be again locked in a position that does not allow contact with the exterior surface or door of the aircraft. Confirmation that the blades are locked and in a stowable orientation is conventionally indicated by electronic sensors that sense a position of a release mechanism. The use of electronic sensors increases programming burdens and requires time consuming calibration and maintenance.

SUMMARY

A disclosed ram air turbine (RAT) includes a movable turbine support structure that is prevented from moving to a stowed position by a stow abort mechanism when turbine blades are not locked in a desired position.

The disclosed example RAT includes turbine blades that drive a turbine. The turbine blades are held in a desired orientation during stowage. The stow abort mechanism includes a pawl that is driven by a cam on a release lever. The release lever is movable in response to a position of a release pin that prevents rotation of a turbine drive shaft from a desired orientation that locks the turbine blades in a desired position required for stowage. The release pin is positioned within a feature in the turbine driveshaft during a successful stow, or it is positioned on the outside of the turbine driveshaft if the turbine blades are misaligned. A release pin that is not engaged in the driveshaft causes the stow abort mechanism to maintain a position where the pawl blocks movement to the deployed position. Engagement of the release pin to prevent rotation results in movement of the pawl to a position that provides for movement to the stowed position. Accordingly, the disclosed stow abort and prevention system prevents movement of the RAT to the stowed position when not in a proper orientation.

These and other features disclosed herein can be best understood from the following specification and drawings, the following of which is a brief description.

DETAILED DESCRIPTION

Figure 1:
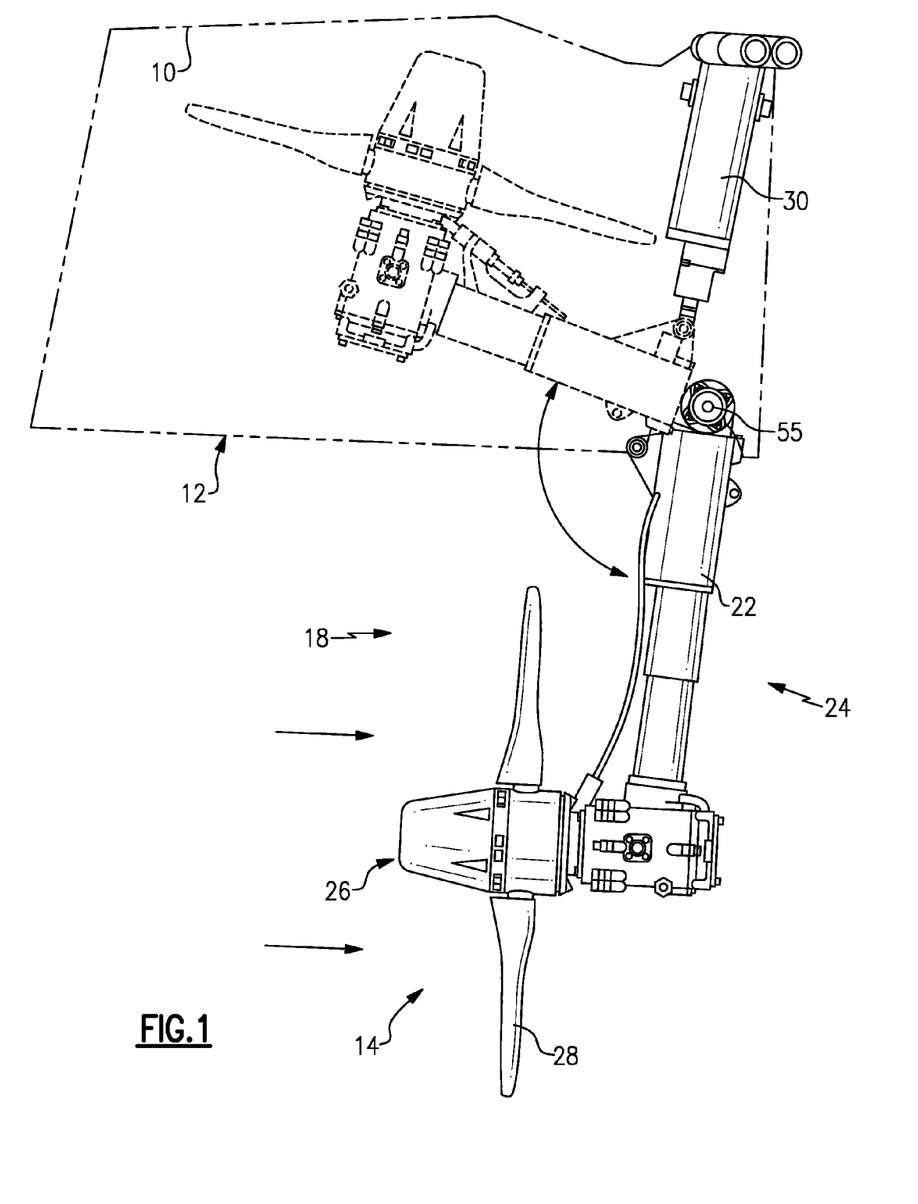
FIG. 1 is a schematic view of movement of an example ram air turbine assembly between stowed and deployed positions.
Figure 2:
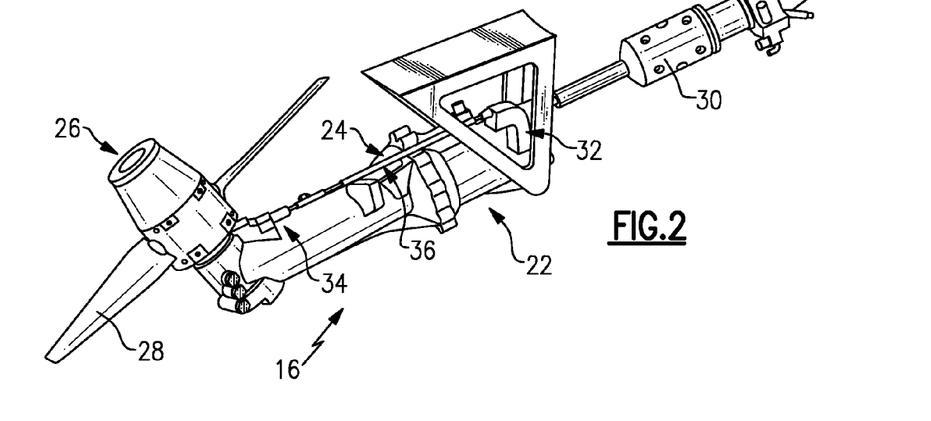
FIG. 2 is a schematic view of an example ram air turbine (RAT) in a stowed position.

Referring to FIGS. 1 and 2, an example aircraft structure 10 is schematically indicated and includes a hatch 12 through which a ram air turbine assembly (RAT) 14 deploys from a stowed position 16 (shown in FIG. 2). The RAT 14 includes a turbine 26 with turbine blades 28 that rotate responsive to air flow along the outside of an aircraft. An actuator 30 moves the RAT 14 from the stowed position 16 to a deployed position 18. Orientation of the turbine blades 28 is maintained in a desired position to prevent contact with the aircraft structure 10 during deployment. A release pin 34 engages a turbine drive shaft 70 (shown in FIG. 7) to maintain the desired position of the turbine blades 28 until clear of the aircraft structure 10. Once the RAT 14 moves toward the deployed position 18, the release pin 34 is pulled from the turbine drive shaft 70 to allow rotation of the turbine blades 28.

Rotation of the turbine blades 28 drives a generator 22 housed within strut 24. The strut 24 supports the turbine 26 away from the aircraft structure 10 and within the airflow along the side of the aircraft. Although generator 22 is disclosed by way of example, the turbine 26 could also drive a hydraulic pump or other device. Once the need for the RAT 14 is complete, it can be moved back to the stowed position 16. However, the turbine blades 28 must be locked in a position that provides clearance through the hatch 12. Accordingly, a stow abort mechanism generally indicated at 32 (shown in FIG. 2) is provided to prevent movement of the RAT 14 to the stowed position 16 when the turbine blades 28 are not in a desired position. The example stow abort mechanism 32 is linked to the release pin 34 through cable 36. The example cable 36 comprises a semi-rigid cable that moves within a protective sheathing to communicate a position of the release pin 34 back to the stow abort mechanism 32. As appreciated, the desired position of the turbine blades 28 is that position where the turbine blades 28 clear the aircraft structure 10 and fit through the hatch 12.

Figure 3:
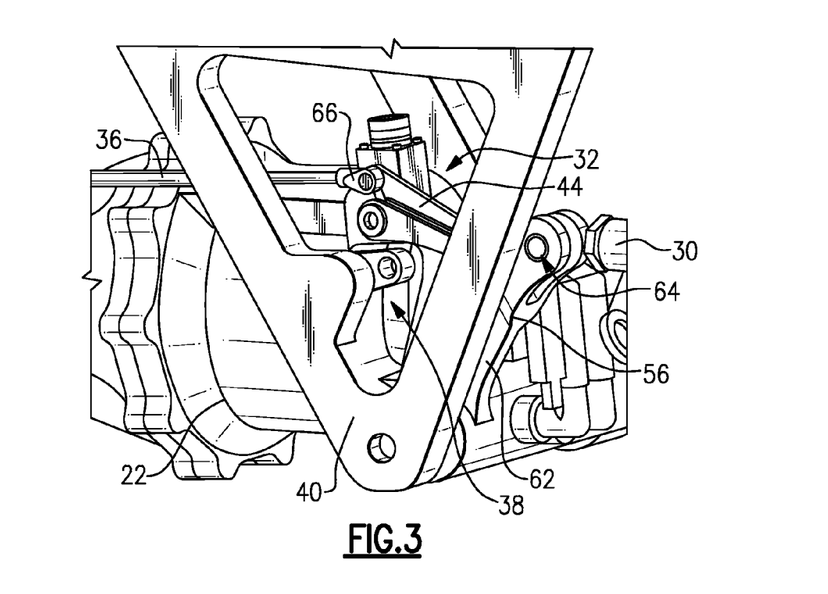
FIG. 3 is a perspective view of an example stow abort mechanism.
Figure 4:
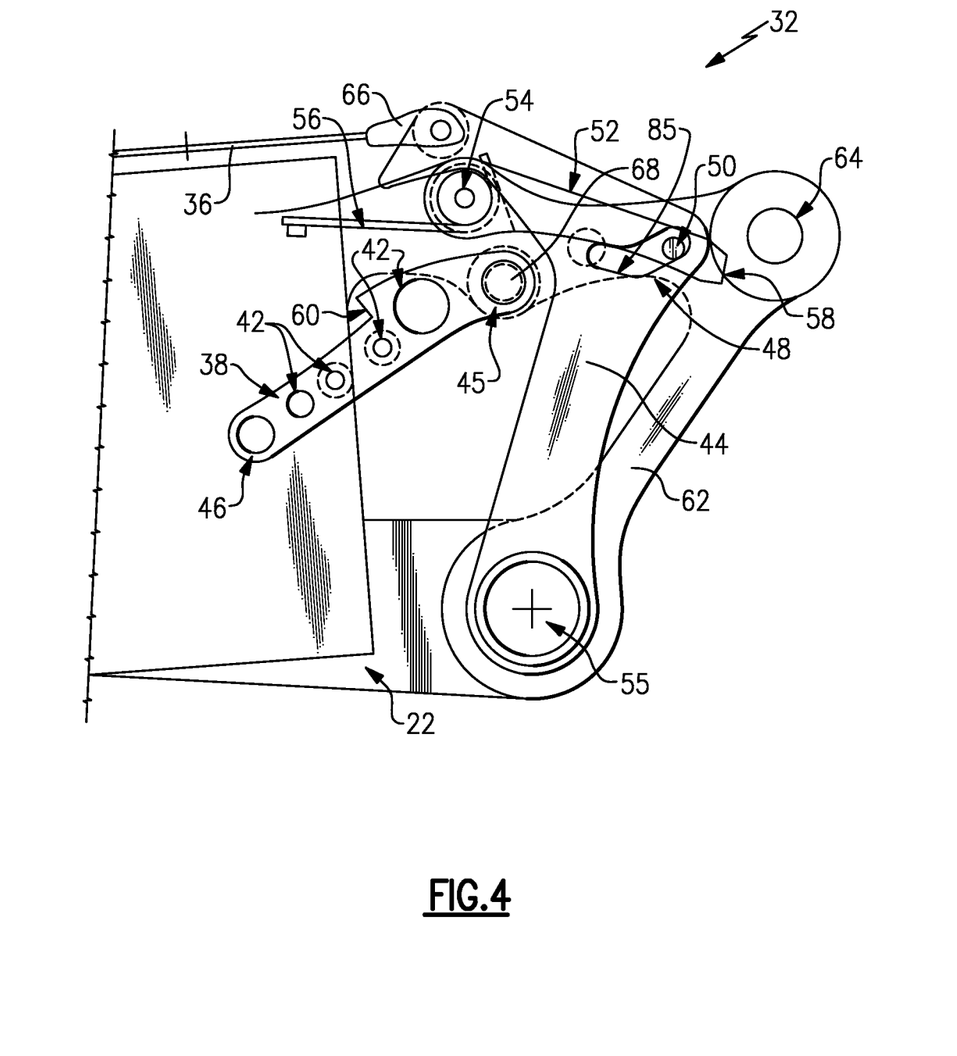
FIG. 4 is a side view of the example stow abort mechanism shown in the stowed position.

Referring to FIGS. 3 and 4, the example stow abort mechanism 32 includes a release lever 44 that is supported on a pivot post 55. The example pivot post 55 also supports rotation of the generator 22 and strut 24 of the RAT 14. The release lever 44 includes a connection 66 to the cable 36. A fixed bracket 38 is attached to a fixed structure of the aircraft. In this example the bracket 38 is attached to support 40 and does not deploy with the RAT 14. The example bracket 38 is mounted to the fixed structure 40 by pins and fasteners 42. The example fastening pins 42 provide a desired location of the bracket 38, while also fixing the bracket 38 in place. The bracket 38 includes a stop pin 46 that limits rotation of the release lever 44. The bracket 38 also includes a stow pin hole 45 that does not include a pin during normal operation. The stow pin hole 45 is used to lock the RAT 14 in the stowed position 16 during maintenance operations.

Figure 5:
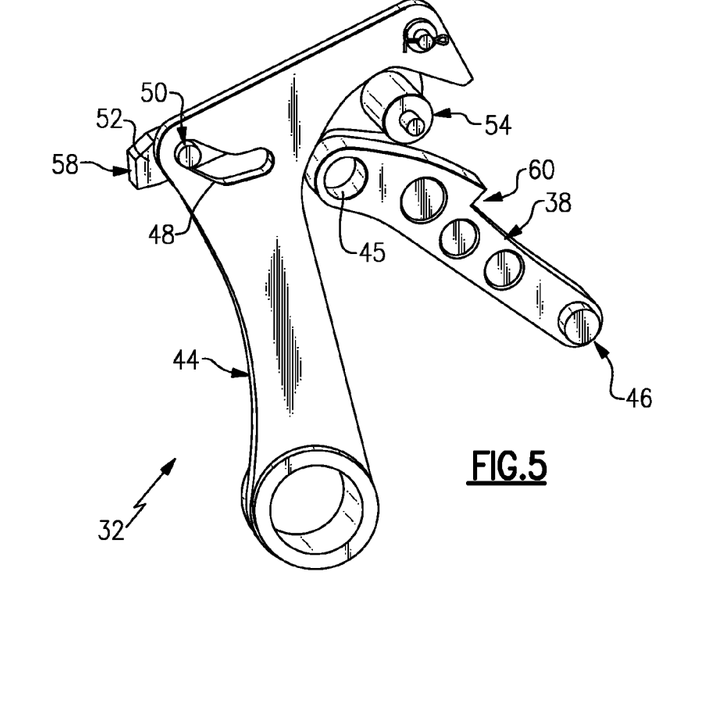
FIG. 5 is a perspective view of component parts of the example stow abort mechanism shown in the stowed position.
Figures 9, 10:
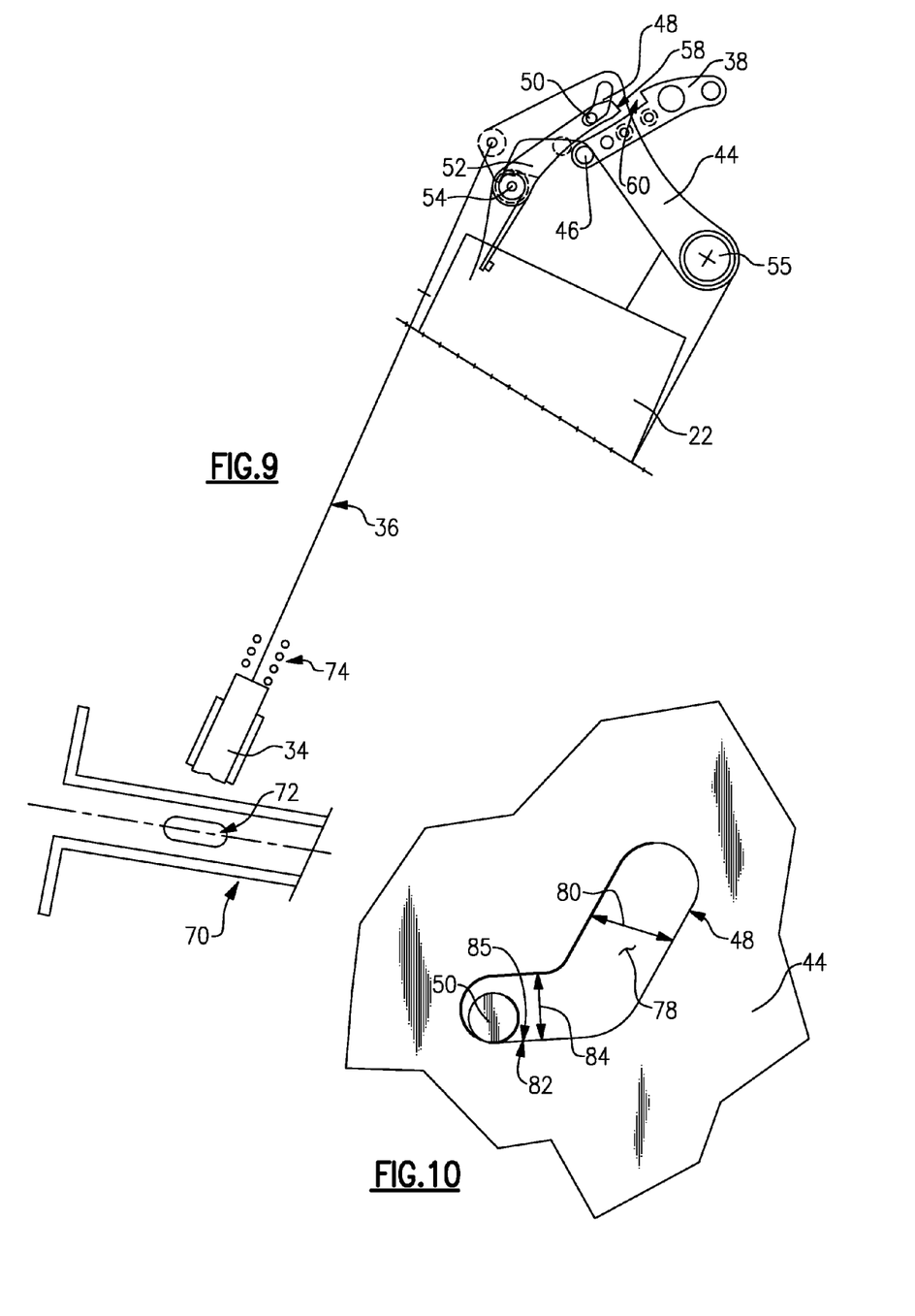
FIG. 9 is a schematic view of the example RAT in a fully deployed position.
FIG. 10 is an enlarged view of an example cam track of the example stow abort mechanism.

Referring to FIGS. 4 and 5, the release lever 44 includes a cam track 48 within which guides a pawl cam pin 50. A pawl 52 rotates about a pawl pivot 54 and is biased by a pawl spring 56. The pawl 52 is moveable between a clearance position and a locking position. The pawl spring 56 biases the pawl 52 such that the pawl cam pin 50 moves toward the lower surface 85 of the cam track 48 as is best shown in FIGS. 4 and 10. The pawl 52 includes a stop surface 58 that is engageable with a locking ridge 60 on the bracket 38 when in the locking position.

The pawl 52 is supported on an arm 62 that is fixed to the generator 22. Accordingly, the arm 62 rotates with the generator 22 when the RAT 14 moves to the deployed position 18. The arm 62 includes a connection point 64 that is attached to the actuator 30. The example arm 62 also includes an opening 68 that receives a pin inserted through the stow pin hole 45 in the fixed bracket 38. As appreciated, no pin is received within the corresponding holes 45 and opening 68 during normal operation. Moreover, the position of the corresponding hole 45 and opening 68 provides the desired strength required to hold the stowed RAT 14 against undesired deployment. Loads from the actuator 30 encountered when a stop pin is engaged through the hole 45 and opening 68 are transmitted a relatively short distance to the fixed structure 40, thereby reducing and/or substantially eliminating undesired loading on the generator 22 and strut 24 to minimize weight.

Figure 6:
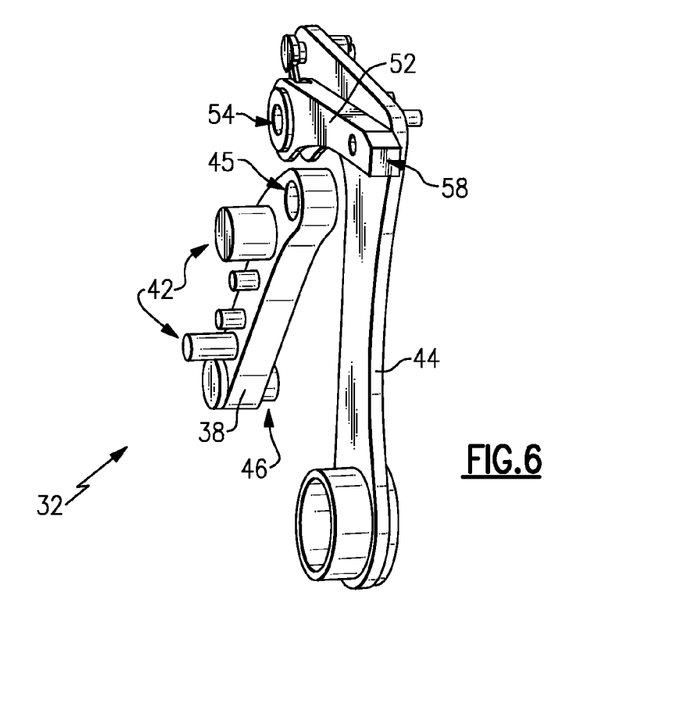
FIG. 6 is another perspective view of the component parts of the example stow abort mechanism.

Referring to FIGS. 5 and 6, the release lever 44, pawl 52 and fixed bracket 38 are shown isolated from the surrounding support structure 40. The bracket 38 and the pawl 52 are disposed within a common plane such that stop surface 58 can engaged the locking ridge 60. Moreover, the release lever 44 is disposed beside the pawl 52 and fixed bracket 38 within a plane common with the stop pin 46. Accordingly, rotation of the release lever 44 is limited upon contact with the stop pin 46. The pawl 52 however is free to continue rotational movement with the RAT 14.

During deployment, both the pawl 52 and the release lever 44 rotate relative to the fixed bracket 38. Upon contacting the stop pin 46, the release lever 44 stops rotation, while the pawl 52 continues movement with the generator 22. The continued movement of the pawl 52 includes a corresponding movement of the pawl cam pin 50 within the cam track 48. During stowing, movement of the pawl cam pin 50 within the cam track 48 causes movement of the pawl 52 to a position aligned with the locking ridge 60 of the fixed bracket 38. If the release lever 44 is not moved responsive to the release pin 34 engaging the turbine drive shaft, then movement toward the stowed position 16 will be prevented by engagement of the stop surface 58 with the locking ridge 60.

Figure 7:
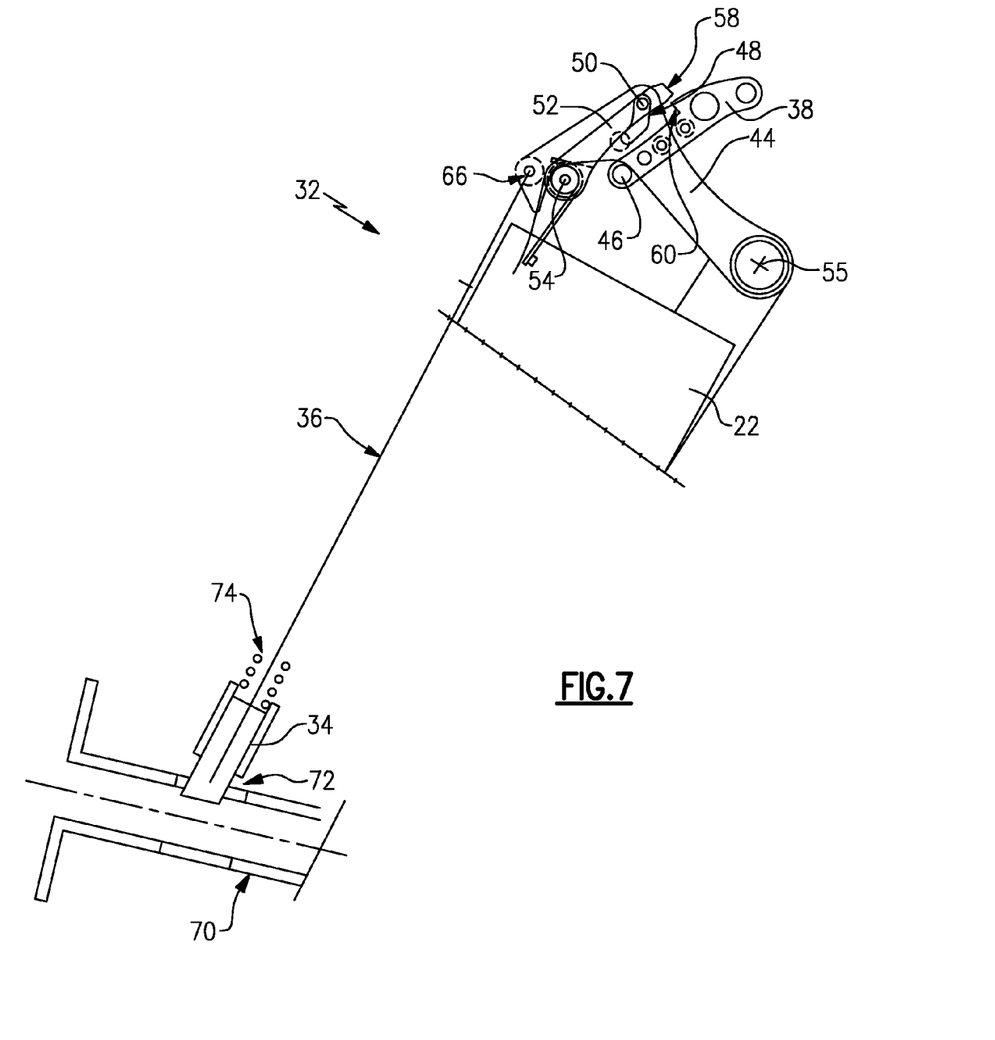
FIG. 7 is a schematic view of the example RAT in a position prior to full deployment.

Referring to FIG. 7, the RAT 14 is shown in a position just prior to the release pin 34 being pulled from an opening 72 of the turbine drive shaft 70 during deployment. Because the release pin 34 is in the opening 72, the turbine drive shaft 70 is prevented from rotating and thereby the turbine blades 28 are maintained in a desired position. A biasing member biases the release pin 34 into the opening 72. In this example, the biasing member is a spring 74.

The release lever 44 is shown in contact with the stop pin 46. The stop pin 46 prevents further rotation of the release lever 44 about the pivot post 55. The pawl cam pin 50 is still in the upper portion 78 (FIG. 10) of the cam track 48 such that the pawl 52 remains in a position that is not aligned with the locking ridge 60 of the fixed bracket 38. Further movement of the RAT 14 causes tension to be exerted on the cable 36 due to the constrained condition of the release lever 44 to pull release pin 34.

Figure 8:
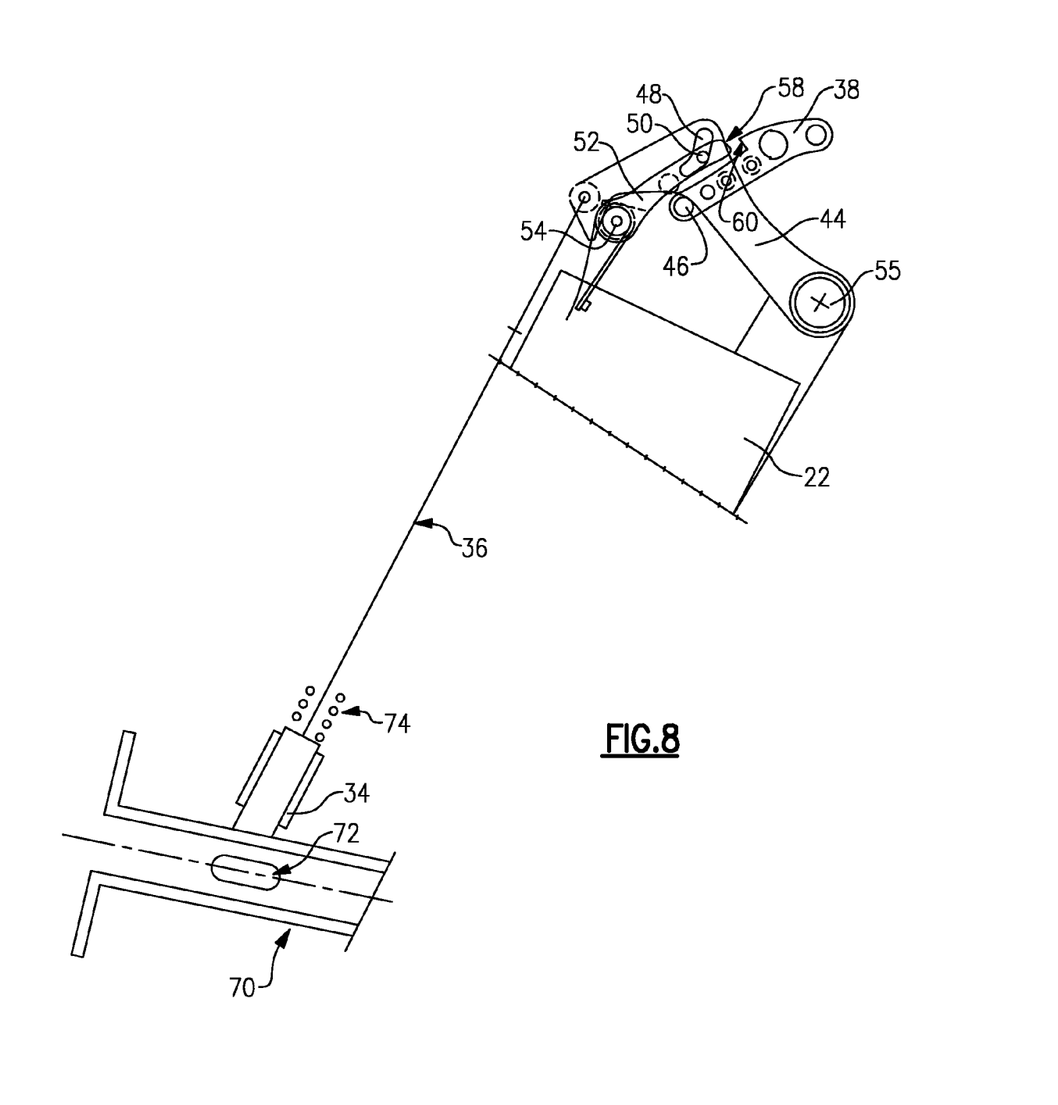
FIG. 8 is a schematic view of the example RAT in another position prior to full deployment.

Referring to FIG. 8, the RAT 14 is shown in a position further rotated toward the fully deployed position 18. In the illustrated position, the now constrained release lever 44 pulls on the cable 36 such that the further movement of the RAT 14 causes the release pin 34 to be pulled free of the opening 72. Accordingly, the turbine shaft 70 is now free to rotate. The release pin 34 is in contact with an outer surface of the turbine shaft 70 but is not engaged with the opening 72.

The pawl 52 continues to rotate with the RAT 14 and relative to the now stopped release lever 44. The relative movement between the pawl 52 and the release lever 44 corresponds to movement of the pawl cam pin 50 within the cam track 48. The pawl cam pin 50 moves into a lower portion 82 (FIG. 10) of the cam track 48 to drive the pawl 52 into a position that aligns the stop surface 58 with the locking ridge 60.

Referring to FIGS. 9 and 10, the RAT 14 is shown in the fully deployed position 18 where the release pin 34 is pulled completely clear of the turbine shaft 70 and the opening 72. The release lever 44 remains in contact with the stop pin 46 and the pawl cam pin 50 is now fully within the lower portion 82 of the cam track 48. Movement of the pawl cam pin 50 into the lower portion 82 of the cam track 48 maintains the pawl 52 in a position that aligns the stop surface 58 with the locking ridge 60. Accordingly, until the pawl 52 is moved out of alignment with the locking ridge 60 of the fixed bracket 38, the RAT 14 will be blocked from moving to the stowed position 16.

The example cam track 48 includes an upper portion 78 and the lower portion 82. The upper portion 78 provides a position where the pawl 52 is not aligned with the locking ridge 60, and the lower portion 82 provides the aligned position. Pawl cam pin 50 is biased towards the lower surface 85 of the cam track 48. The upper portion 78 includes a width 80 that is greater than a width 84 of the lower portion 82. The greater width of the upper portion 78 provides a greater ability to accommodate any build up of debris or foreign matter. As the upper portion 78 provides for a clearance, additional tolerance can be provided. In the lower portion 82, the cam track 48 narrows to provide the desired position and alignment of the pawl 52.

Figure 11:
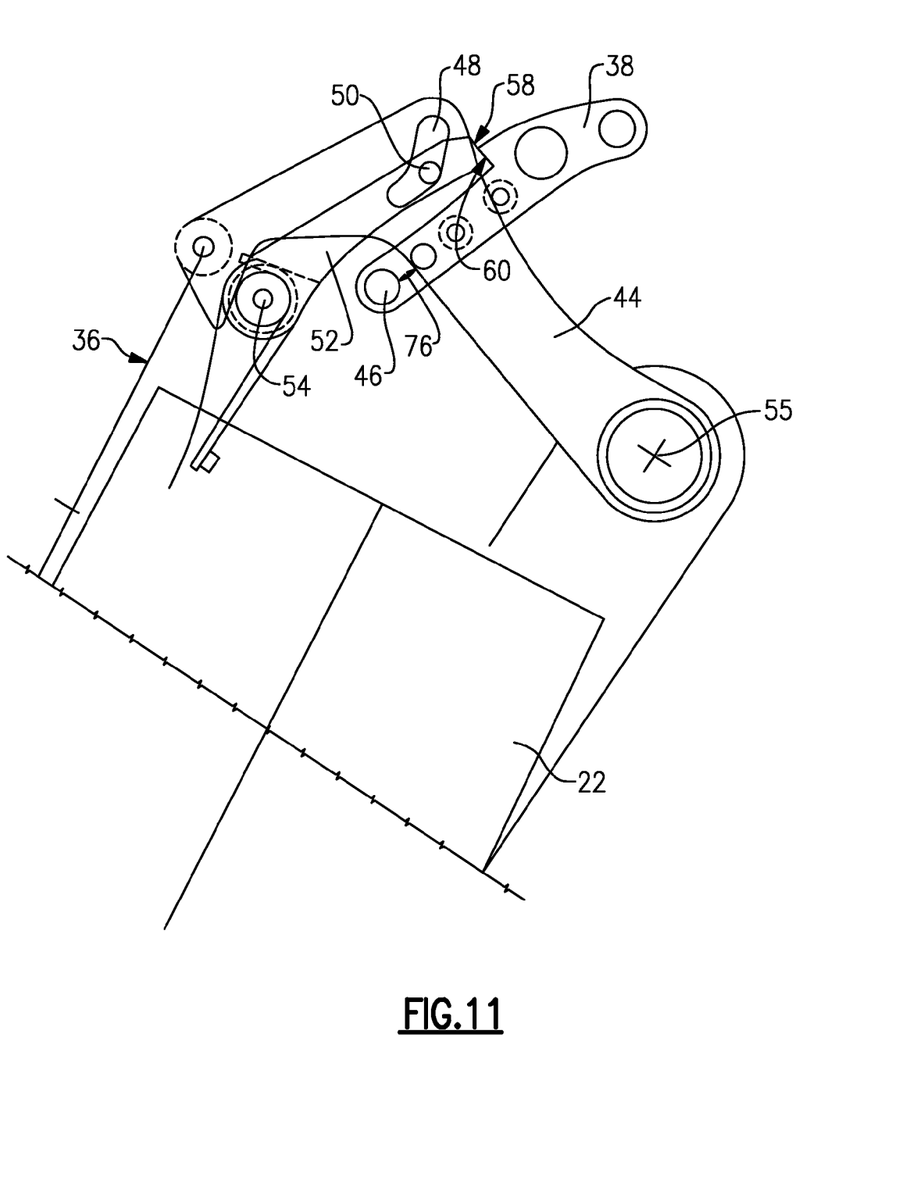
FIG. 11 is a schematic view of the example stow abort mechanism in a blocking position.

If the blades are misaligned during a stow operation, the RAT 14 moves from a position shown in FIG. 8, where release pin 34 is not received within the opening 72 of the turbine shaft 70, to the blocking position shown in FIG. 11. Because the release pin 34 is not within the opening 72, the release pin 34 will engaged an outer surface of the turbine shaft 70. Rotation of the RAT 14 toward the stowed position causes a corresponding pushing on the release pin 34 that is communicated through the release cable 36 to the release lever 44. The release lever 44 is then pushed away from the stop pin 46 a distance indicated at 76. Movement away from the stop pin 46 causes the pawl cam pin 50 to remain within the lower portion 82 of the cam track 48, (FIG. 11), thereby maintaining alignment of the stop surface 58 on the pawl 52 with the locking ridge 60 of the fixed bracket. Contact between the stop surface 58 and the locking ridge 60 prevents further movement of the RAT 14.

The RAT is redeployed to the FIG. 9 position after the aborted stow described above. A successful stow is described next after the blades have been correctly aligned. Referring back to FIG. 7 with continued reference to FIG. 11, once the release pin 34 is again received within the opening 72, the release lever 44 is free to move into abutment with the stop pin 46. The movement of the release lever 44 the distance 76 into abutment with the stop pin 46 causes a corresponding movement of the pawl cam pin 50 within the cam track 48. The pawl cam pin 50 moves into the upper portion 78 of the cam track 48, thereby releasing the pawl 52 to move to a position that no longer aligns the stop surface 58 with the locking ridge 60. The RAT 14 is therefore free to move completely to the stowed position 16.

Accordingly, the disclosed stow abort mechanism 32 prevents movement to the stowed position 16 without properly aligned turbine blades 28. Moreover, the disclosed stow abort mechanism 32 operates without external sensors to assure stowage of the RAT 14 with the turbine blades 28 in the correct desired position.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A ram air turbine assembly comprising:
a release pin movable between an engaged position that prevents rotation of a drive shaft and a released position that allows rotation of the drive shaft;
a release lever movable responsive to a position of the release pin;
a pawl pivotal about a pawl pivot between a clearance position and a locking position in response to a position of the release lever; and
a lock engaged by the pawl when the pawl is in the locking position to prevent movement of the ram air turbine assembly to a stowed position, wherein the release lever includes a cam track and the pawl includes a cam pin guided within the cam track for pivoting the pawl about the pawl pivot such that movement of the release lever drives the pawl between the clearance position and the locking positions.

2. The ram air turbine assembly as recited in claim 1, including a link between the release pin and the release lever.

3. The ram air turbine assembly as recited in claim 2, including a stop that restricts movement of the release lever such that the link moves the release pin to the released position.

4. The ram air turbine assembly as recited in claim 3, wherein the pawl is driven to the locking position once the release lever moves away from the stop.

5. The ram air turbine assembly as recited in claim 1, wherein the drive shaft includes an opening for receiving the release pin, and the release pin is biased toward the drive shaft.

6. The ram air turbine assembly as recited in claim 1, wherein the lock comprises a surface on a fixed bracket that engages the pawl in the locking position.

7. The ram air turbine assembly as recited in claim 6, wherein the fixed bracket includes an opening for receiving a stow pin for maintaining the ram air turbine in the stowed position.

8. A stow prevention assembly for a ram air turbine comprising:
a release pin movable between an engaged position that fixes a position of a drive shaft and a released position;
a release lever movable responsive to a position of the release pin;
a pawl pivotal about a pawl pivot between a clearance position and a locking position responsive to movement of the release lever; and
a locking ridge engaged by the pawl when the pawl is in the locking position such that the ram air turbine is prevented from moving to a stowed position, wherein the release lever includes a cam track that drives the pawl about the pawl pivot to the locking position when the release lever moves responsive to the release pin being in the released position.

9. The stow prevention assembly as recited in claim 8, including a stop restricting movement of the release lever and causing movement of the release pin from the engaged position to the released position.

10. The stow prevention assembly as recited in claim 8, wherein the locking ridge comprises a surface on a fixed bracket.

11. The stow prevention assembly as recited in claim 8, including a flexible link between the release pin and the release lever.

12. The stow prevention assembly as recited in claim 8, including a first biasing member biasing the release pin toward the engaged position.

13. The stow prevention assembly as recited in claim 8, wherein the release lever is pivotally mounted to a fixed structure supporting the ram air turbine.

14. A ram air turbine assembly comprising:
a movable support structure attachable to a fixed structure;
a turbine mounted to the movable support structure, the turbine including at least one turbine blade and a drive shaft driven by the turbine blade responsive to an airstream proximate an aircraft structure;
a release pin movable between an engaged position that prevents rotation of the drive shaft and a released position;
a pawl pivotal about a pawl pivot between a clearance position and a locking position responsive to movement of the release pin, wherein the pawl engages a fixed bracket to prevent movement of the support structure to a stowed position when in the locking position; and
a release lever movable with the release pin, the release lever including a cam track and the pawl including a pawl cam pin guiding within the cam track for pivoting the pawl about the pawl pivot between the clearance position and the locking position.

15. The ram air turbine assembly as recited in claim 14, including a stop fixed to the fixed bracket of limiting movement of the release lever.

* * * * *